(12) United States Patent
Fujita

(10) Patent No.: US 7,740,324 B2
(45) Date of Patent: Jun. 22, 2010

(54) DRAINABLE VEHICLE WHEEL AND VEHICLE INCORPORATING SAME

(75) Inventor: Masayuki Fujita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/011,252

(22) Filed: Jan. 25, 2008

(65) Prior Publication Data
US 2008/0185905 A1   Aug. 7, 2008

(30) Foreign Application Priority Data
Feb. 5, 2007   (JP) ............... 2007-025788

(51) Int. Cl.
*B60B 1/08* (2006.01)
*B60B 1/12* (2006.01)
(52) U.S. Cl. ..................... 301/65; 301/104
(58) Field of Classification Search .......... 301/65, 301/104
See application file for complete search history.

(56) References Cited

U.S. PATENT DOCUMENTS 1,484,844 A * 2/1924 Olle ................ 301/95.108
1,742,044 A * 12/1929 Meldrum .............. 301/67
2,631,897 A * 3/1953 Ewart ................... 301/65
6,402,256 B1 * 6/2002 Mercat ............. 301/95.104

FOREIGN PATENT DOCUMENTS

| JP | 61092754 A | * | 5/1986 |
| JP | 62074701 A | * | 4/1987 |
| JP | 62096101 A | * | 5/1987 |
| JP | 09104201 A | * | 4/1997 |
| JP | 2002273546 A | * | 9/2002 |
| JP | 2005-297688 | | 10/2005 |

* cited by examiner

*Primary Examiner*—S. Joseph Morano
*Assistant Examiner*—Kip T Kotter
(74) *Attorney, Agent, or Firm*—Carrier, Blackman & Associates, P.C.; William D. Blackman; Joseph P. Carrier

(57) ABSTRACT

A drainable vehicle wheel having a hub, a plurality of spokes extending radially from the hub and a rim having tips ends of the spokes connected thereto. Each of the plurality of spokes has a hollow portion and a plurality of water-discharge hole formed therein. The hub has an outer hollow portion formed by a plurality of walls, and one the walls has a drain hole formed therein. The outer hollow portion of the hub is fluidly connected to a hollow portion formed in each of the spokes. A wall of the tip end portion of each of spokes is thickened or reinforced to increase stiffness of the spokes.

17 Claims, 5 Drawing Sheets

DRAINABLE VEHICLE WHEEL AND VEHICLE INCORPORATING SAME

CROSS-REFERENCE TO RELATED APPLICATIONS

The present application claims priority under 35 USC §119 based on Japanese patent application No. 2007-025788, filed on Feb. 5, 2007. The entire subject matter of this priority document is incorporated by reference herein.

BACKGROUND OF THE INVENTION

1. Field of the Invention

The present invention relates a drainable vehicle wheel having a hub, a rim and a plurality of spokes extending radially from the hub to the rim. More particularly, the present invention relates to a drainable vehicle wheel of the type described in which each of the spokes includes a hollow portion and has one or more fluid-discharge openings formed therein, and to a vehicle incorporating the drainable vehicle wheel.

2. Description of the Background Art

There are known vehicle wheels which are designed to be light in weight and to be stiff against loads of various types. In order to reduce the weight of a vehicle wheel, the vehicle wheel may be manufactured to have one or more hollow structures formed in the one or more spokes thereof. However, since fluid, such as water, may enter the interior of the vehicle with such a hollow structure, the vehicle wheel must be configured to allow the water to be easily drained off.

An example of drainable vehicle wheel (a cast wheel) for a motorcycle, including a hollow portion in which drain holes are formed, is disclosed in Japanese Laid-open Patent Application No. 2005-297688 (FIGS. 1 and 2).

According to this reference, as shown FIG. 1 and FIG. 2 thereof, a cast wheel for a motorcycle includes a hub 1 into which an axle of the vehicle body is inserted; three spokes 3 radially extending from the hub 1; and a rim 2 connected to tip ends of these spokes 3. Each of the spokes 3 has a hollow portion 3c formed therein, which is enclosed with a thin wall portion 3a having a substantially uniform thickness, and a pair of through holes 3b are formed in the thin wall portion 3a at positions close to the rim 2.

If water enters the hollow portion 3c of the vehicle wheel, the water may be drained off through the pair of through holes 3b.

However, since the pair of through holes 3b are formed in the thin wall portion 3a at a predetermined distance away from the rim 2 (and not at tip end portion thereof), water gets collected in the spokes. For example, when the pair of through holes 3b are situated on the lower side (as shown in FIG. 2 of Japanese Laid-open Patent Application No. 2005-297688), water collects up to the level corresponding to the aforementioned predetermined distance in the interior of the spoke portion 3 provided with the through holes 3b.

Accordingly, due exposure to the water, it is forseeably possible that rust, oxidation or other corrosion may be formed on the inner surface of the spoke portion 3, which may cause reduction in thickness of the wall of each of the spokes 3. As a result, in some areas, the spokes 3 may be decreased in strength.

The present invention has been made to overcome such drawbacks. Accordingly, it is an object of the present invention to provide a drainable vehicle wheel adapted to draw off the water from the hollow portions of the spokes substantially entirely.

SUMMARY OF THE INVENTION

To achieve the above-mentioned objects, the present invention according to a first aspect provides a drainable vehicle wheel having a hub into which an axle of an vehicle is inserted, a plurality of spokes extending radially from the hub, each of the spokes having a hollow portion formed therein; and a rim which is connected to a tip end of each of these spokes, and which supports a tire.

The vehicle wheel according the first aspect is characterized in that a water-discharge hole is formed in the tip end portion of each of the spokes so as to allow water, which enters a hollow portion of each of the spokes, to be drained off substantially entirely; and that a portion of wall of each of the spokes where the water-discharge hole is formed is thickened, i.e., reinforced.

The present invention according to a second aspect, in addition to the first aspect, is characterized in that the vehicle is a motorcycle, and that the wall of each of the spokes is variably thickened in such a manner that the side surface of the hollow portion of the thickened wall has a convex shape.

The present invention according to a third aspect, in addition to one of the first and second aspects, is characterized in that the each of the spokes is formed to have a tapered shape toward the rim when viewed from a side of the vehicle.

The present invention according to a fourth aspect, in addition to the first aspect, is characterized in that the hub having an inner hollow portion formed therein into which the axle is inserted; and an outer hollow portion that surrounds and encloses the inner hollow portion, and that the outer hollow portion communicate with the hollow portion of at least one of the spokes.

The outer hollow portion of the hub is formed by connecting an outer peripheral wall to a pair of side walls (a first side wall and a second side wall). A drain hole is formed in the first side wall, which is situated adjacent to a brake disc. The first side wall and the outer peripheral wall are continuously connected to each other through an inclined wall. Water drained off through the drain hole flows between the first side wall and the brake disc and thereafter flows into a wide passage formed between the inclined wall and the brake disc.

The present invention according to a fifth aspect, in addition to the fourth aspect, is characterized in that a sensor ring for detecting wheel speed is attached to the brake disc with a bolt, in such a manner that a tip of the bolt projected from the brake disc faces the inclined wall.

According to the first aspect of the present invention, since the pair of water-discharge holes is formed in the tip end portion of each of the spokes, the water which enters the hollow portion of each of the spokes can be substantially completely drained off, that is, no water remains in the hollow portion of each of the spokes. As a result, the present invention provides a drainable vehicle wheel adapted to drain off the water from the spokes of the wheel substantially entirely.

Moreover, since the portion of wall of each of the spokes where the water-discharge hole is formed is thickened, i.e., reinforced, the stiffness of spokes can be ensured against loads of various types.

According to the second aspect of the present invention, the vehicle is a motorcycle, and a wall of each of the spokes is variably thickened in such a manner that the side surface of the hollow portion of the thickened wall has a convex shape. Accordingly, the increased thickness of the spokes does not affect the aesthetic surfaces of the spokes and the appearances of the spokes are improved. Hence, the appearance of the motorcycle may be improved.

According to the third aspect of the present invention, each of the spokes is formed to have a tapered shape toward the rim when viewed from a side of the vehicle. Accordingly, a vehicle wheel having the plurality of spokes can be lighter in weight than a vehicle wheel having spokes formed to have a uniform width (size) toward the rim.

According to the fourth aspect of the present invention, a drain hole is formed in the first side wall (e.g., one of the pair of side walls) which partly forms the outer hollow portion of the hub; the first side wall and the outer peripheral wall are continuously connected to each other through the inclined wall; and water drained off through the drain hole flows between the side wall and the brake disc, and thereafter flows into the wide passage formed between the inclined wall and the brake disc.

Accordingly, when a large amount of water flows into the outer hollow portion, the water drained off through the drain hole can flow into the wide passage. Hence, it is possible to provide a vehicle wheel which allows the large amount of entering water to be drained off easily and quickly, and also substantially entirely, due to the location of the drain hole proximate the wheel rim.

According to the fifth aspect of the present invention, the tip of the sensor ring-attaching bolt projected from the brake disc faces the inclined wall. Thus, the inclined wall avoids interference between the first side wall situated adjacent to the brake disc and the bolt. Therefore, the drainability of the vehicle wheel is substantially improved.

For a more complete understanding of the present invention, the reader is referred to the following detailed description section, which should be read in conjunction with the accompanying drawings.

DETAILED DESCRIPTION OF ILLUSTRATIVE EMBODIMENTS

It should be understood that only structures considered necessary for illustrating selected embodiments of the present invention are described herein. Other conventional structures, and those of ancillary and auxiliary components of the system, will be known and understood by those skilled in the art.

Figure 1:
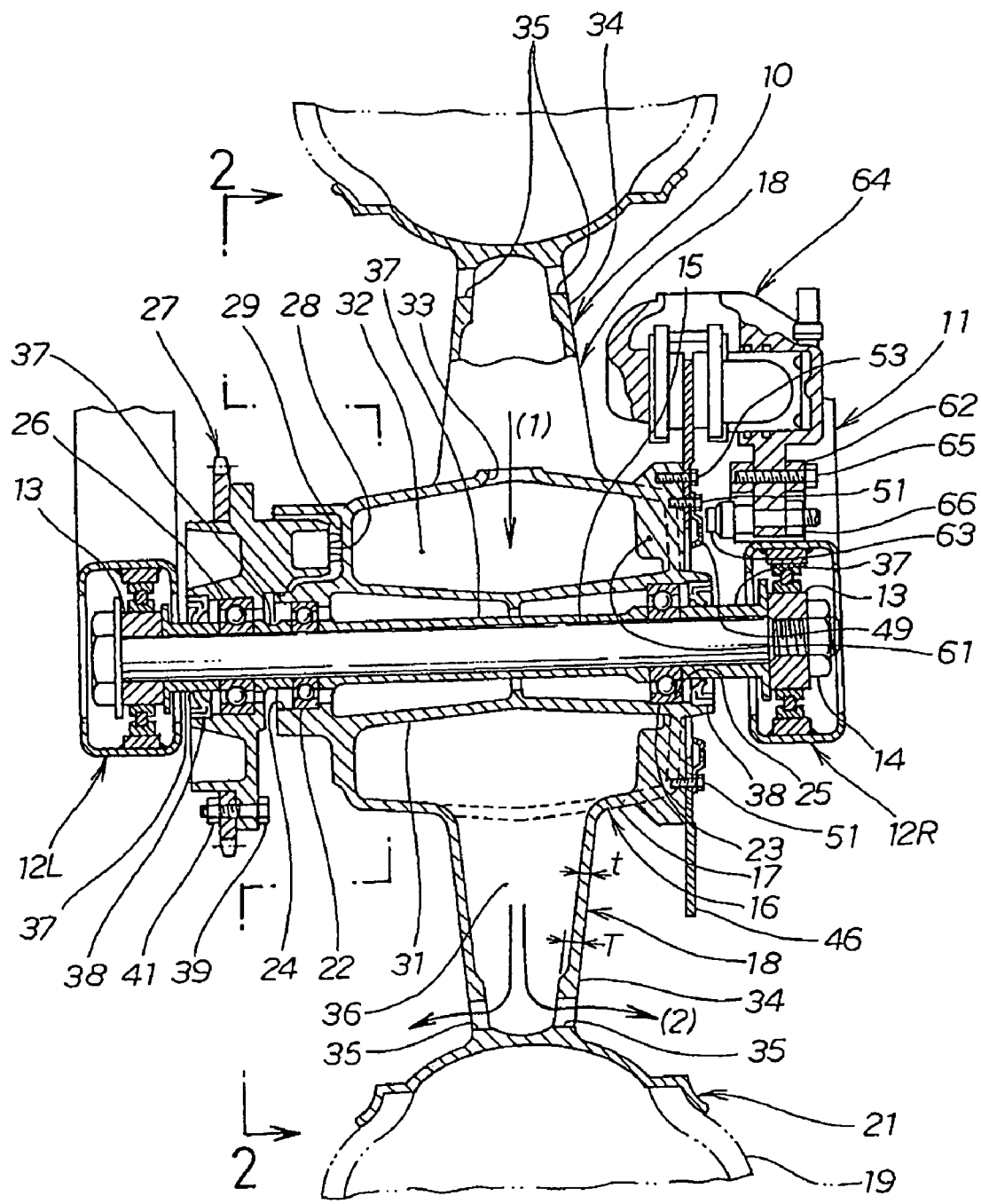
FIG. 1 is a cross-sectional view of a drainable vehicle wheel according to the present invention.
Figure 2:
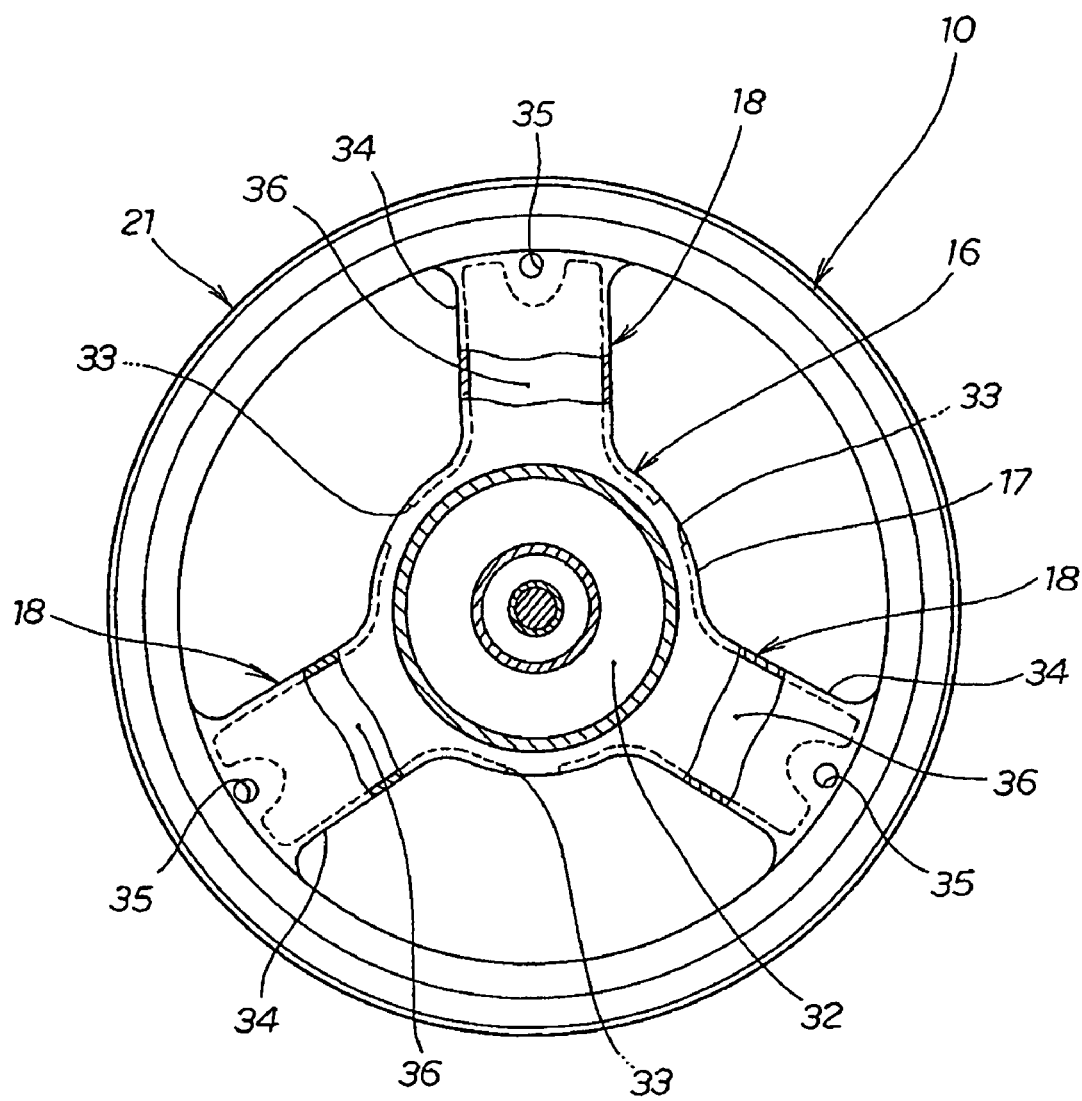
FIG. 2 is a cross-sectional view taken along a line 2-2 of FIG. 1.
Figure 3:
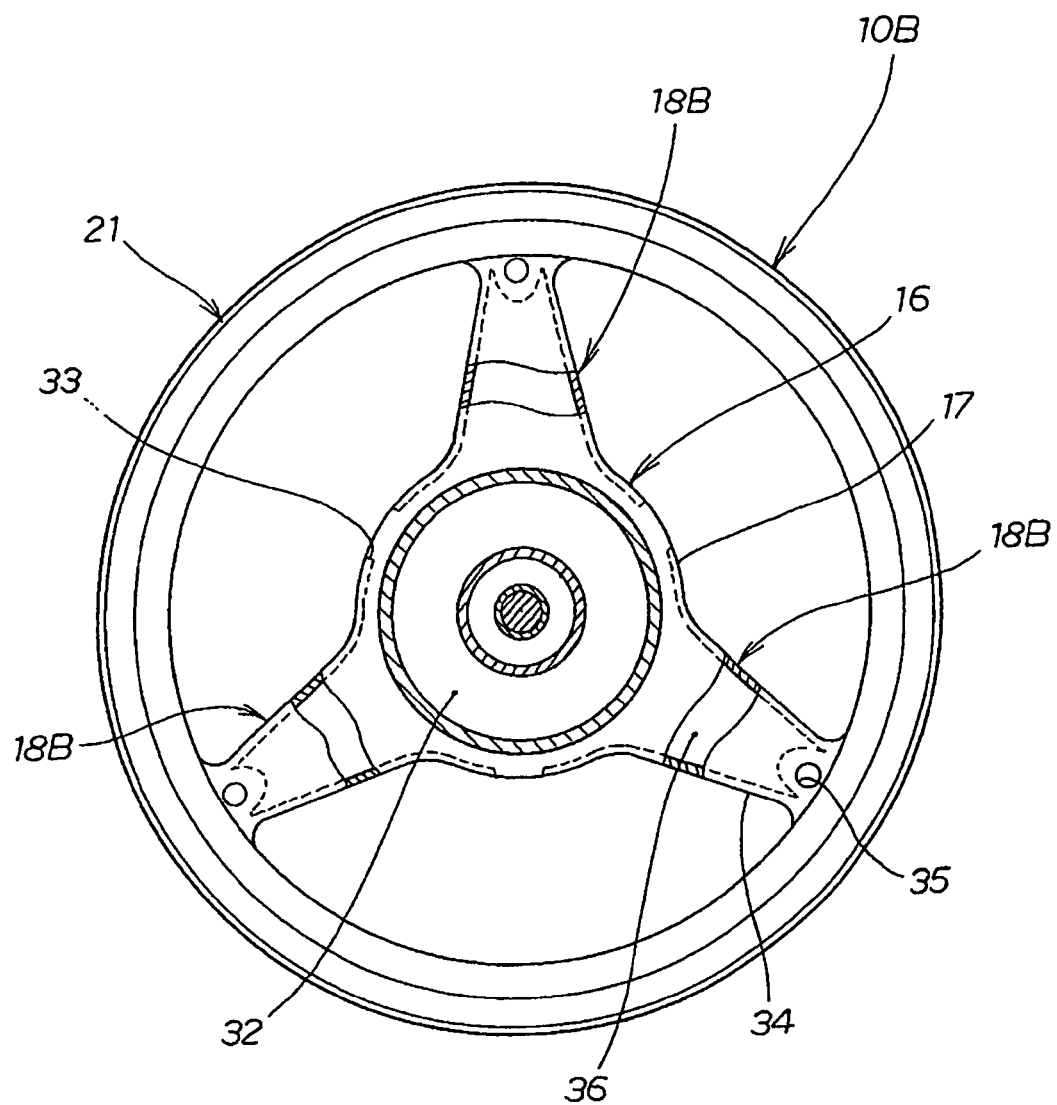
FIG. 3 is a view of a modified embodiment of FIG. 2.
Figure 4A:
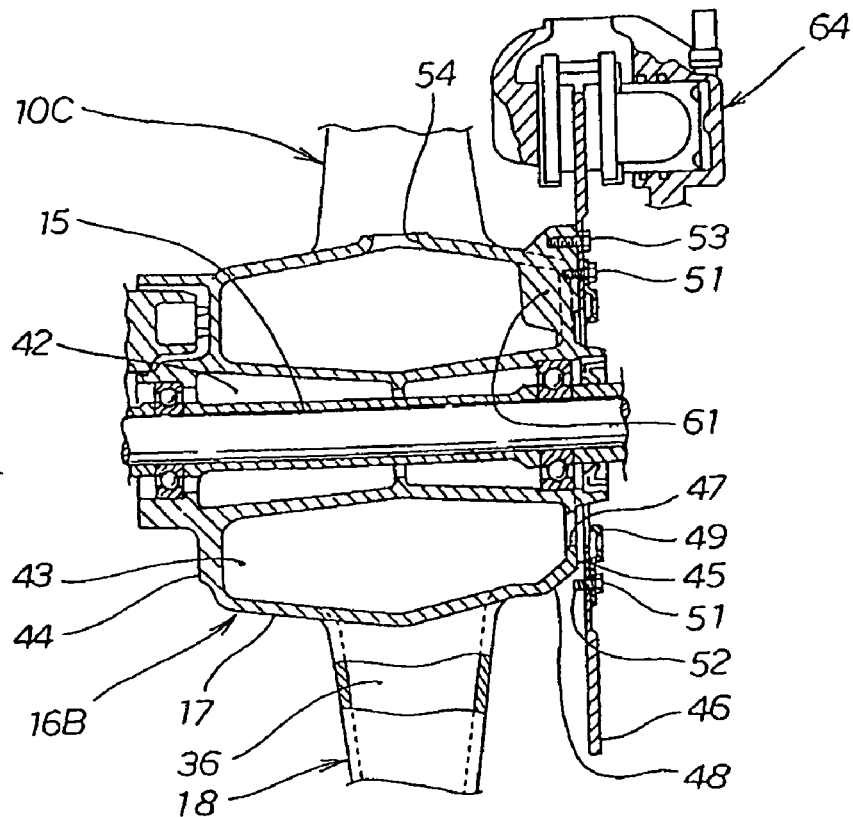
FIG. 4A is a view of a modified embodiment of FIG. 1.
Figure 4B:
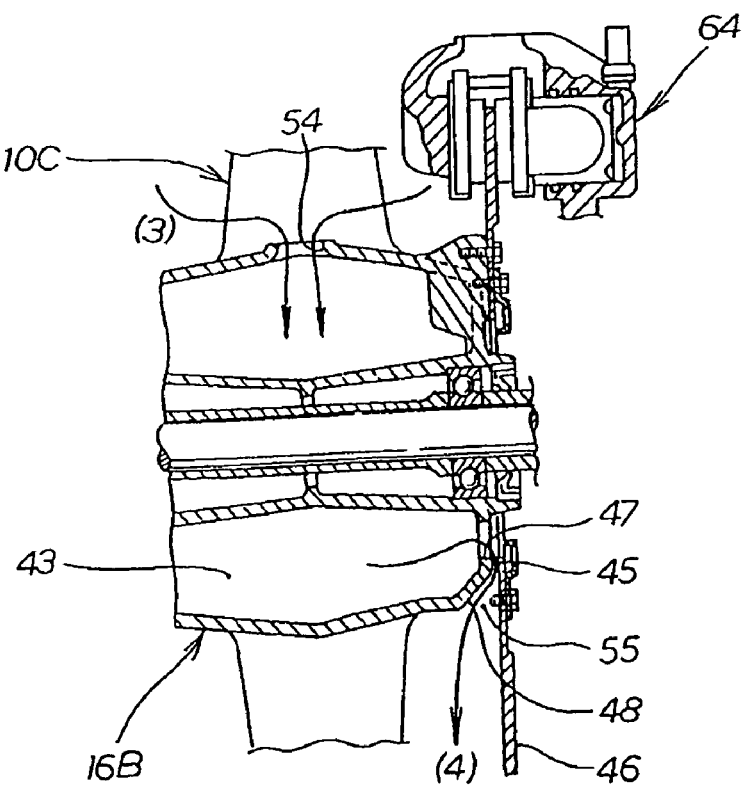
FIG. 4B is another view of a modified embodiment of FIG. 1.
Figure 5:
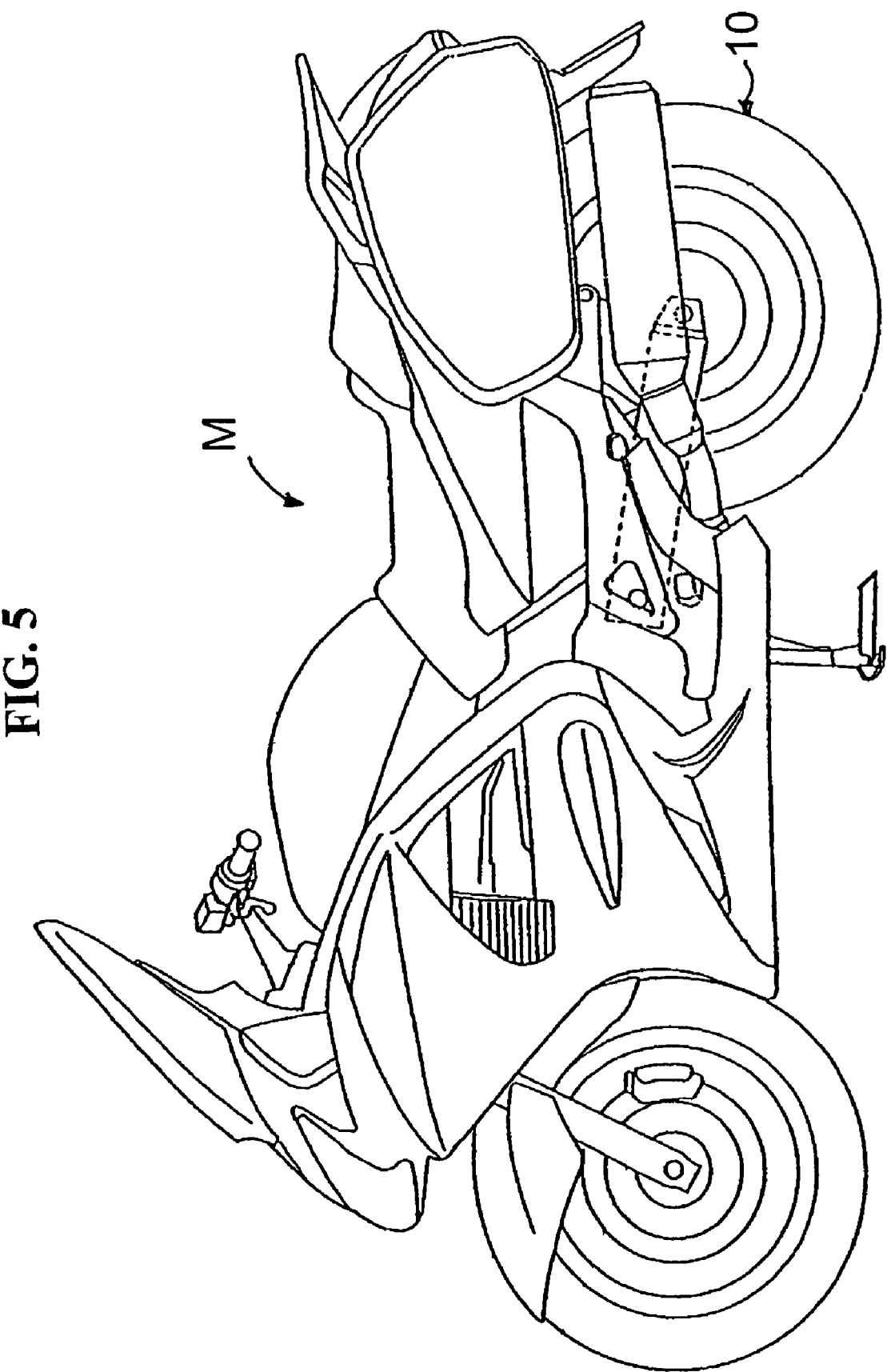
FIG. 5 is view of a vehicle (motorcycle) incorporating the drainable vehicle wheel according to an illustrative embodiment of the present invention.

Hereinafter, selected illustrative embodiments of the present invention are discussed, with reference to the accompanying drawings. FIGS. 1-2 show illustrative embodiments of first and second aspects of the present invention. FIG. 3 shows an illustrative embodiment of a third aspect of the present invention; while FIGS. 4A-4B show an illustrative embodiment of fourth and fifth aspect of the present invention. FIG. 5 shows a vehicle (motorcycle) incorporating the drainable vehicle wheel as disclosed in one or more aspects of the present invention.

FIG. 1 is a cross-sectional view of a vehicle wheel according to the present invention. The vehicle may be a motorcycle or any vehicle having wheels with spokes, the wheel may be either front wheel or a rear wheel of the vehicle. In the following description, as an example, a motorcycle and a rear wheel thereof is discussed.

As shown in FIGS. 1-2, a rear wheel 10 of the motorcycle M includes a hub 16, a plurality of spokes 18 (may be three, as shown in FIG. 2), and a rim 21.

Referring also to FIG. 5, the motorcycle includes a main body 11 having a pair of rear swing arms 12L and 12R. Each of the swing arms 12L, 12R has a support block 13 formed therein. The support blocks 13, 13 and a nut 14 support an axle 15.

Each of the three spokes 18 extends radially outwardly (in the up and down direction in FIG. 1) from an outer peripheral wall 17 formed on the outermost periphery of the hub 16, and has a hollow portion 36 (extended longitudinal opening) formed therein. The rim 21 is connected to tip ends of these spokes 18. The rim 21 supports a tire 19.

Further, as shown in FIGS. 1-2, the hub 16 has a left bearing fitting hole 24, a right bearing fitting hole 25, multiple power transmission holes 29, and three holes 33 (fluidly connected to hollow portion 36 of at least one spokes 18) formed therein. A left bearing 22 and a right bearing 23 for supporting the axle 15 are fitted into the left bearing fitting hole 24 and the right bearing fitting hole 25, respectively. A flanged driven sprocket wheel 27, with multiple buffer materials 28 interposed in between, is fitted into the multiple power transmission holes 29.

Here, the flanged driven sprocket wheel 27 is disposed between the rear swing arm 12L and the hub 16, and is attached to the axle 15 via a bearing 26. A circumferential-shaped hollow portion 32 is formed radially around outer side of the axle 15. A cylindrical intermediate partition wall 31 is disposed between the circumferential-shaped hollow portion 32 (also referred as an outer hollow portion) and the axle 15. The cylindrical intermediate partition wall 31 is formed on the radially outer side of the axle 15. The three holes 33, 33, 33 (fluidly connected to hollow portion 36 of at least one spokes 18) are formed in the outer peripheral wall 17 of the hub 16.

In addition, as shown in FIG. 1, the hub 16 is provided with a brake disc 46, a sensor ring 49, a speed sensor 63, and a caliper 64. The brake disc 46 is attached to a thick side wall 61 of the hub 16 by using multiple brake disc attaching bolts 53. The thick side wall 61 is continuously formed on right side of the outer peripheral wall 17 (FIG. 1). The sensor ring 49 is a sensor for detecting wheel speed. The sensor ring 49 is attached to the thick side wall 61 with multiple sensor attaching bolts 51 so as to overlap with the brake disc 46.

The speed sensor 63 is disposed close to the sensor ring 49, and is supported by a support member 62 placed on the rear swing arm 12R. The caliper 64 straddling the brake disc 46 is disposed above the speed sensor 63, and is supported by the support member 62.

At least one fluid-discharge hole 35 (also termed as a water-discharge hole 35) is formed in a tip end portion 34 of each of the spokes 18. Generally, two water-discharge holes 35, 35 are formed in the tip end portion 34. A portion of wall of each of the spokes 18 where the water-discharge hole is formed is thickened, i.e., reinforced. In other word, a wall of each of spokes 18 is thickened only in the tip end portion 34 having water-drainage holes 35, 35 formed therein. It will be understood from FIG. 1 that the outer tip end portion of the hollow portion extends inwardly of the water-discharge hole in a longitudinal direction of each of the spokes.

In addition, the wall of each of the tip end portions 34 is thickened in a manner that its surface has a convex shape, i.e., the wall of the tip end portion slightly bulges outside with respect to a hollow portion 36 formed in each of the spokes. Here, the hollow portion 36 is formed in the interior of each of the spokes 18 and is fluidly connected to the circumferential-shaped outer hollow portion 32 of the hub 16.

As shown in FIG. 1, the wall thickness T of each of the tip end portions 34 is greater than a thickness t of the remaining portion of each of the spokes 18. It is preferable that T is set in a range of $1.1\,t \leq T \leq 2.0\,t$. A reduction in strength due to the formation of water-discharge holes 35 in the tip end portion 34 of the spokes 18 is compensated by partially thickening the wall of each of spokes 18.

Further, the drainable vehicle wheel and a mounting assembly thereof according to the present invention includes a spacing member 37, an oil seal 38, a sprocket wheel attaching bolt 39, a sprocket wheel attaching nut 41, a connecting bolt 65, and a sensor attaching nut 66.

A rotational power supplied from an engine (not shown) is transmitted to the flanged driven sprocket wheel 27 via a drive sprocket wheel and a chain, and thereby the rear wheel 10 is rotated. When the rear wheel 10 is being rotated, the rear swing arms 12L, 12R, the axle 15, an inner ring of the left bearing 22, an inner ring of the right bearing 23, an inner ring of the bearing 26, multiple spacing members 37, the speed sensor 63 and the caliper 64 are in a stationary state. While the flanged driven sprocket wheel 27, an outer ring of the bearing 26, the rear wheel 10, an outer ring of the left bearing 22, an outer ring of the right bearing 23, the oil seals 38, 38, the brake disc 46 and the sensor ring 49 are rotated when the rear wheel 10 is being rotated.

FIG. 2 is a cross-sectional view taken along the line 2-2 of FIG. 1. Three spokes 18 extend radially and equi-angularly from the outer peripheral wall 17 of the circumferential-shaped hub 16. The spokes 18, 18, 18 are connected to the rim 21 disposed concentrically around the hub 16.

Furthermore, a tip end portion 34 of each of spokes 18 is provided with water-discharge holes 35. The water accumulated inside the spoke is drained off through the water-discharge holes 35. The water that entered into the interior of spokes through the holes 33, 33, 33 formed in the outer peripheral wall 17 of the hub 16 is also drained off through the water-discharge holes 35 (after flowing through the outer hollow portion 32 of the hub 16, and the hollow portion 36 of the spokes 18).

Although according to the above illustrative embodiments, the vehicle wheel includes three spokes, the wheel may include four or more spokes, and the number of spokes is not particularly limited.

An operation of the drainable rear wheel 10 having the above-described structure is discussed below.

Referring to FIG. 1, if water enters the circumferential-shaped hollow outer portion 32 of the hub 16 through one of the holes 33 of the hub 16 as shown by an arrow (1), then the water from the circumferential-shaped hollow portion 32 flows into the hollow portion 36 of one of the spokes 18 that is below the hub 16 since the hollow portion 32 of the hub 16 is extended along circumference of the hub 16. Thereafter, the water is drained off through two water-discharge holes 35, 35 formed at tip end portions of each of the spokes, as shown by an arrow (2).

Accordingly, because the rear wheel 10 is configured so that water entering the hollow portion 36 of each of the spokes 18 can be drained off by forming the water-discharge holes 35, 35 in the tip end part 34 of the spoke portion 18, no water can possibly remain in the hollow portion 36 of each of spokes 18.

As a result, it is possible to provide the rear wheel 10 adapted to drain off the water entered into the hollow portion 36 substantially entirely. Further, stiffness of the spokes can be ensured since, as shown in FIG. 1, a wall of each of spokes 18 is thickened (reinforced) only in the tip end portions 34 where the water-discharge holes 35, 35 are formed.

In addition, in one illustrative embodiment hereof, the vehicle is a motorcycle, and the wall of each of the spokes 18 is partially thickened (reinforced) in such a manner that the surface thereof has a convex shape in an area of the hollow portion 36. Accordingly, the increased thickness does not affect the aesthetic appearance of surfaces of the spokes 18, and the appearances of the spokes 18 are improved. Accordingly, the appearance of the motorcycle can be improved. It will be understood from FIG. 1 that the reinforcement, having convex shape in an area of the hollow portion 36, is provided on an inner wall of the spoke, such that the reinforcement is not visible from outside of the wheel.

Besides an improved appearance, a high-speed capability is required for vehicles including a motorcycle. One method for achieving a high-speed capability is building a light vehicle body. The following is description of an embodiment in which the rear wheel 10 has reduced weight.

FIG. 3 is a view of a modified embodiment of FIG. 2. The components in common with FIG. 2 are denoted by the same reference numerals, and explanation thereof is omitted.

A plurality of spokes 18B of a rear wheel 10B are characterized by being formed to have a tapered shape toward the rim 21 as viewed from a side of the vehicle (e.g., a motorcycle). Accordingly, the spokes 18B can be lighter in weight than the conventional spokes formed to have a uniform constant width toward the rim 21.

The aforementioned rear wheel 10B (or 10) is configured so that water entering the hollow portion 36 of each of the spokes 18 or 18B can be drained off through the water-discharge holes 35.

Another embodiment of the present invention includes drainable vehicle wheel in which water is drained from the hub 16. Such vehicle wheel may be necessary when a large amount of water flowing into the circumferential-shaped outer hollow portion 32 of the hub 16, required to be drained off extremely efficiently. The embodiment of the present invention in which the hub 16 is provided with a drainage structure (e.g., a drain hole) is discussed below.

FIGS. 4A and 4B are views of a modified embodiment of FIG. 1. The features that are common with FIG. 1 are denoted by the same reference numerals, and explanation thereof is omitted.

As shown in FIG. 4A, a hub 16B of a rear wheel 10C has an inner hollow portion 42 into which the axle 15 is inserted and a circumferential-shaped outer hollow portion 43 that encloses the inner hollow portion 42. The outer hollow portion 43 communicates with at least one of hollow portions 36 of spokes 18.

The outer hollow portion 43 is enclosed with a pair of side walls 44, 45 (a first side wall 45, a second side wall 44) and an outer peripheral wall 17 connected to these side walls 44, 45. A drain hole 47 is formed in the first side wall 45, disposed adjacent to a brake disc 46. The first side wall 45 and the outer peripheral wall 17 are continuously connected to each other via an inclined wall 48.

Furthermore, the sensor ring 49 for detecting wheel speed is attached to the brake disc 46 by using the sensor attaching bolt 51, and a tip 52 of the sensor ring attaching bolt projected from the brake disc 46 faces the inclined wall 48.

As shown in FIG. 4B, when water enters the outer hollow portion 43 through one of the holes 54 formed in the outer periphery wall 17 (connected to the outer hollow portion 43) as shown by an arrow (3), then the water entered into the outer hollow portion 43 flows into the lower portion of the outer hollow portion 43 since the outer hollow portion 43 has a circumferential shape.

Subsequently, the water that entered into the outer hollow portion 43 is drained off through the drain hole 47 as shown by an arrow (4). Thereafter, the water further flows between the side wall 45 and the brake disc 46, and then flows into a wide passage 55 formed between the inclined wall 48 and the brake disc 46.

Thus, the hub 16B is configured so that the drain hole 47 is formed in the side wall 45, which is disposed on one side of the outer hollow portion 43. The first side wall 45 and the outer peripheral wall 17 are continuously connected to each other through the inclined wall 48. The water drained off through the drain hole 47 flows between the first side wall 45 and the brake disc 46, and thereafter flows into the wide passage 55 between the inclined wall 48 and the brake disc 46.

Accordingly, when a large amount of water flows into the outer hollow portion 43, the water drained off through the drain hole 47 can flow into the wide passage 55. Therefore, it is possible to provide the rear wheel 10C, which allows the large amount of entering water to be drained off efficiently and effectively.

The tip 52 of the sensor ring attaching bolt projected from the brake disc 46 faces the inclined wall 48. Thus, the inclined wall 48 which prevents interference between the side wall 45 and the sensor ring attaching bolt 51 is also utilized for further improving drainability of the rear wheel 10C.

In one embodiment hereof, the drainable vehicle wheel of the present invention may be mounted on a motorcycle.

Further, although the vehicle wheel used in the present invention is a rear wheel of a motorcycle according to the above-described embodiments, the present invention can also be applied to a front wheel of a motorcycle or to wheels of a three-wheel or four-wheel vehicle. The present invention can be safely applied to wheels of general vehicles.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A vehicle wheel comprising:
    a hub for receiving an axle of a vehicle;
    a plurality of spokes extending radially outwardly from the hub, each of said plurality of spokes having a hollow portion with a water-discharge hole formed therein, said hollow portion comprising an inner part proximate the hub and having a first wall thickness, and an outer tip end portion spaced away from the hub and having a second wall thickness which is greater than the first wall thickness; and
    a rim connected to said outer tip end portion of each of the plurality of spokes, said rim supporting a tire thereon;
    wherein said water-discharge hole is formed in said outer tip end portion of each of the spokes proximate the rim so as to allow water which enters said hollow portion of each of the spokes to be drained off; and wherein a portion of a wall of the outer tip end portion of each of the spokes is thickened in an area thereof adjacent the water-discharge hole; and
    wherein said second wall thickness of said outer tip end portion of the hollow portion extends inwardly of said water-discharge hole in a longitudinal direction of each of the spokes.

2. The vehicle wheel according to claim 1, wherein said vehicle is a motorcycle; and wherein said portion of the wall of each of the spokes has a variable thickness such that the surface thereof has a convex shape.

3. The vehicle wheel according to claim 2, wherein each of said plurality of spokes is formed to have a tapered shape toward the rim when viewed from a side of the vehicle.

4. The vehicle wheel according to claim 1, wherein when viewed from a side of the vehicle, each of said plurality of spokes is formed to have a tapered shape as it extends toward the rim.

5. The vehicle wheel according to claim 1, further comprising
    the hub having an inner hollow portion and outer hollow portion formed therein; wherein said outer hollow portion encloses said inner hollow portion, and is formed around outer periphery of the inner hollow portion;
    said inner hollow portion receiving said axle;
    said outer hollow portion communicating with said hollow portion of one of said plurality of spokes;
    said outer hollow portion formed by an outer peripheral wall, a pair of side walls having a first wall and a second wall, each connected to the outer peripheral wall; said first wall having at least one drain hole formed therein;
    said first side wall and the outer peripheral wall being continuously connected to each other through an inclined wall; and
    a brake disc disposed adjacent to said first wall;
    wherein water drained off through said at least one drain hole flows between the first side wall and the brake disc, and thereafter flows into a wide passage formed between the inclined wall and the brake disc.

6. The vehicle wheel according to claim 5, further comprising a sensor ring for detecting wheel speed during vehicle operation; wherein said sensor ring is attached to the brake disc with a bolt in a manner such that a tip of the bolt, projected from the brake disc, faces the inclined wall.

7. The vehicle wheel according to claim 1, wherein the wheel comprises three spokes.

8. The vehicle wheel according to claim 1, wherein a portion of the wall adjacent the water-discharge hole therein is reinforced.

9. The vehicle wheel according to claim 8, wherein the reinforcement is provided on an inner wall of the spoke.

10. The vehicle wheel according to claim 9, wherein the thickened wall portion of the tip end portion of each of the respective spokes comprises the reinforcement.

11. The vehicle wheel according to claim 1, wherein the second wall thickness is in a range between 1.1 and 2.0 times the first wall thickness.

12. A motorcycle comprising a pair of wheels, each of said wheels having:
    a hub;
    at least three spokes extending radially from the hub, each of said spokes having a hollow portion and a water-discharge hole formed therein, said hollow portion comprising an inner part disposed proximate the hub and having a first wall thickness, and an outer tip end portion spaced away from the hub and having a second wall thickness which is greater than the first wall thickness;
    said hollow portion formed longitudinally in each of said spokes; and a rim connected to the outer tip end portion of each of the spokes, said rim supporting a tire thereon, wherein said water-discharge hole is formed at the outer tip end portion of each of the spokes so as to allow water which enters said hollow portion of each of the spokes to be drained off; and wherein a wall of the outer tip end portion of each of the spokes is reinforced; and wherein said second wall thickness of said outer tip end portion of the hollow portion extends inwardly of said water-discharge hole in a longitudinal direction of each of the spokes.

13. A motorcycle according to claim 12, wherein said second wall thickness of the tip end portion of each of the spokes is greater than a thickness of a remaining portion of each of the respective spokes.

14. A motorcycle according to claim 12, wherein said second wall thickness of the tip end portion of each of the spokes is at least 1.1 times a thickness of a remaining portion of each of the respective spokes.

15. A motorcycle according to claim 12, wherein each of said spokes is formed to have a tapered shape toward the rim.

16. A motorcycle according to claim 12, further comprising the hub having an inner hollow portion and outer hollow portion formed therein; and said outer hollow portion formed by connecting an outer peripheral wall with a pair of side walls having a first wall and a second wall; said first wall having a drain hole formed therein;

wherein said outer hollow portion encloses said inner hollow portion, and is formed around outer periphery of the inner hollow portion; and wherein said outer hollow portion communicates with said hollow portion of at least one of said spokes.

17. A motorcycle according to claim 16, further comprising a brake disc disposed adjacent to said first wall;

an inclined wall connecting said first wall and said outer peripheral wall;

wherein said brake disc and said inclined wall are disposed such that a wide passage is formed therebetween; and wherein water drained off through the drain hole flows between the first side wall and the brake disc, and thereafter flows into the wide passage.

* * * * *